UNITED STATES PATENT OFFICE.

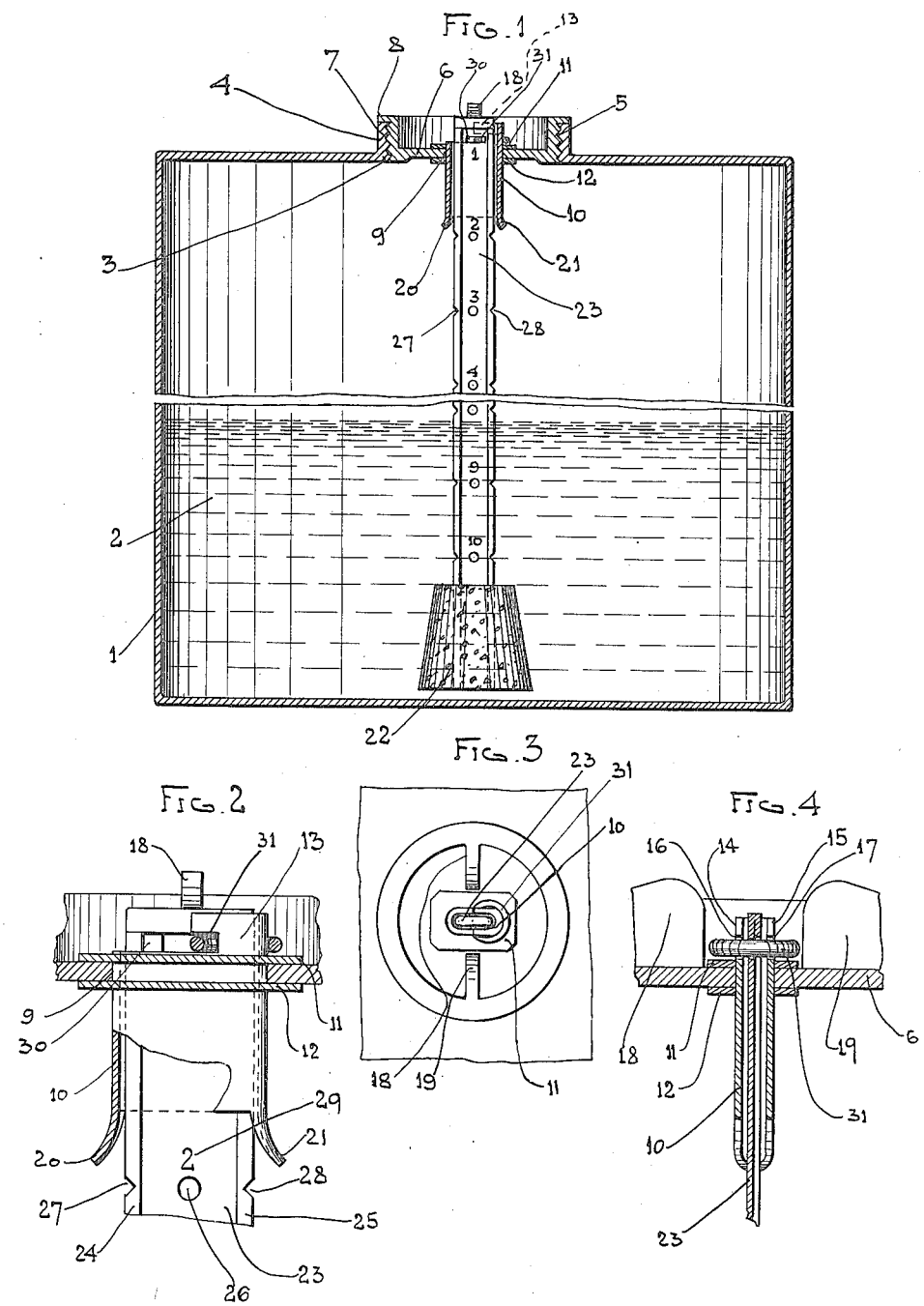

ISAAC HARRISON, OF PITTSBURGH, PENNSYLVANIA.

FLUID-INDICATOR.

1,162,916.  Specification of Letters Patent.  Patented Dec. 7, 1915.

Application filed April 16, 1915. Serial No. 21,856.

*To all whom it may concern:*

Be it known that I, ISAAC HARRISON, a citizen of the United States, residing at Pittsburgh, in the county of Allegheny and State of Pennsylvania, have invented certain new and useful Improvements in Fluid-Indicators, of which the following is a specification.

This invention relates to fluid indicators more particularly adapted for use in indicating the amount of gasolene contained in a tank in connection with motor vehicles or boats although it is to be understood that the indicator can be employed for any purpose wherein it is found applicable.

The invention has for its object to provide an indicator for the purpose set forth with means, in a manner as hereinafter referred to, for quickly ascertaining the amount of fluid in a tank by sight or touch.

A further object of the invention is to provide an indicator for the purpose set forth, with means in a manner as hereinafter referred to, to enable one to ascertain by feeling the indicator rod the amount of fluid in a tank.

A further object of the invention is to provide an indicator for the purpose set forth with a vertically movable float operated indicating or measuring member and further with means, in a manner as hereinafter referred to, associated with said member to arrest oscillatory movement of the latter while moving vertically and to further prevent any sticking or retarding of the member during the vertical movement thereof.

A further object of the invention is to provide an indicator for the purpose set forth with a float operated indicating or measuring member having a guide associated therewith and further carrying means associated with the guide for normally maintaining said indicating or measuring member in a lowered position.

Further objects of the invention are to provide a fluid indicator which is simple in its construction and arrangement, strong, durable, efficient and convenient in its use, readily set up with respect to the tank containing the fluid, and inexpensive to manufacture.

With the foregoing and other objects in view the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a vertical sectional view of a tank containing a body of fluid and showing the adaptation therewith of a fluid indicator in accordance with this invention. Fig. 2 is an enlarged sectional detail, broken away, of a fluid indicator in accordance with this invention. Fig. 3 is a top plan view illustrating a lock for the indicating member. Fig. 4 is a vertical sectional view, broken away, of the indicating member and taken at right angles to the section shown in Fig. 1.

Referring to the drawings in detail 1 denotes a tank containing a body of fluid 2 and having its top formed with an opening 3, and further having its top provided with a vertically disposed integral collar 4 formed with interior threads 5. The inner face of the collar 4 forms a continuation of the wall of the opening 3 and the wall of said opening 3 is threaded so as to provide for a continuation of the threads 5. The opening 3 is closed by a cup-shaped flange cap 6 which has peripheral threads 7 engaging with the threads 5 of the collar 4. The flange of the cap 6 is indicated at 8 and when the cap is in position to close the opening 3, the flange 8 is seated upon the top edge of the collar 4.

The body portion of the collar 6 has an oval-shaped opening 9 arranged centrally thereof and extending down through the said opening 9 is an oval-shaped tube 10 which constitutes a guide member. Carried by the tube 10 are peripheral flanges 11, 12, which are secured respectively to the upper and lower faces of the body portion of the cap 6 whereby the tube 10 is fixedly secured in position. The tube 10 is extended as at 13 and such extension is semi-oval-shaped in plan and is cut away at its inner side to provide projections 14, 15, which are spaced from the flange 11 and said projections 14, 15, form a pair of pockets 16, 17, for the purpose to be presently referred to.

Formed integral with the upper face of the body portion of the cap 6 and extending at right angles with respect to the tube 10 is a pair of thumb pieces 18, 19, which are employed to facilitate the removal or the positioning of a cap 6 with respect to the collar 4 for the purpose of closing the opening 3.

The tube 10 at its lower end has a pair of oppositely disposed flaring projections 20, 21, to prevent the sticking or retarding of the indicating or measuring member, to be presently referred to, when the said member moves in an upward direction.

Arranged within the tank 1 is a float operated indicating or measuring member and which consists of a buoyant body 22, preferably constructed of cork and tapering in contour, and fixedly secured in said body 22 is a float metallic bar 23 which is capable of being moved upward through the tube 10 by the action of the buoyant body 22. The bar 23 has the longitudinally marginal portions 24, 25 thereof, bent upon itself for the purpose to reinforce said bar lengthwise and the latter is furthermore provided with a series of centrally disposed spaced openings 26 and a series of centrally disposed edge notches 27, 28. Associated with each opening 26 is a pair of notches 27, 28 and said bar 23 has each side thereof provided with numbers as at 29, and the said numbers associate with the members 26 and are provided to indicate the number of gallons of fluid in the tank 1. By way of example the numbers upon the bar 23 are one to ten and each number is arranged above an opening 26. The smaller number is positioned near the top of the bar 23.

The bar 23 at its upper end is provided with an eccentrically disposed rectangular slot 30 and mounted within and of a diameter capable of swinging over the upper corners of the said bar 23, is a ring or link 31 and the function of the latter is to engage under the projections 14, 15, and around the extension 13, whereby the indicating or measuring member is locked and maintained in a lowered position.

When the ring 31 is shifted clear of the projections 14, 15, the buoyant body 22 will vertically move the bar 23 and the movement of said bar will continue until the buoyant body 22 arrives at the level of the liquid thus projecting the bar to the height of the fluid within the tank and one can ascertain the amount of fluid or liquid remaining in the tank.

What I claim is:—

1. A device of the class described comprising the combination with the closure cap of a fluid tank, of a tube extending through and depending from said cap, said tube having an extension provided with projections, a float operated indicating and measuring member movable through said tube and provided with means for indicating different quantities of liquid, said member having its upper end provided with a slot, and means extending through said slot and capable of engaging under such projections and around said extensions for locking said tube from movement.

2. A device of the class described comprising the combination with the closure cap of a fluid tank, of a tube extending through and depending from said cap, said tube having an extension provided with projections, a float operated indicating and measuring member movable through said tube and provided with means for indicating different quantities of liquid, said member having its upper end provided with a slot, and means extending through said slot and capable of engaging under such projections and around said extension for locking said member from movement, said tube having its lower end flaring to prevent the retarding of said member during its upward movement.

3. A device for the purpose set forth comprising a fluid indicating and measuring member consisting of a float, a flat bar having the marginal portions thereof bent upon itself to reinforce said bar and further secured at its lower end to said float, a guide tube for said member, and shiftable means permanently carried by said member and engaging with said tube to arrest movement of the member, said member provided with means for indicating different quantities of liquids.

4. A device for the purpose set forth comprising a fluid indicating and measuring member consisting of a float, a flat bar having the marginal portions thereof bent upon itself to reinforce said bar and further secured at its lower end to said float, a guide tube for said member, and means carried by said member and engaging with said tube to arrest movement of the member, said member provided with means for indicating different quantities of liquids, and said tube having each of its edges provided with spaced notches associating with said indicating means.

5. The combination with a closure cap of a receptacle, of an oval-shaped sleeve secured thereto and depending therefrom, a float operated indicating and measuring member movable through said tube and provided with openings and notches and further provided with means associated with said openings and notches for indicating the different quantities of fluid, and shiftable means permanently carried by the upper end of said member and detachably engaging with said tube to arrest vertical movement of the member.

6. The combination with a closure cap of a receptacle, of an oval-shaped sleeve secured thereto and depending therefrom, a float operated indicating and measuring member movable through said tube and provided with openings and notches and further provided with means associated with said openings and notches for indicating the different quantities of fluid, and shiftable means permanently carried by the upper end of said member and detachably engaging with said tube to arrest vertical movement of the member said tube provided with means at its lower end to overcome retarding of the upward movement of said member when the latter is disconnected from said tube.

7. The combination with a closure cap of a receptacle, of an oval-shape tube secured intermediate its ends to the cap and depending therefrom, said tube having its upper end cut away to provide pockets, a float operated indicating and measuring means movable through said tube and provided with openings and notches, and further provided with means associated with said openings and notches for indicating different quantities of fluid, and shiftable means carried by the upper end of said member and detachably engaging in said pockets to arrest vertical movement of the member.

In testimony whereof I affix my signature in presence of two witnesses.

ISAAC HARRISON.

Witnesses:
B. E. JENKINS,
LUELLA H. SIMON.